Jan. 29, 1952   R. L. WILCOX   2,583,677
METHOD OF MAKING WASHER FACE NUTS OR THE LIKE
Filed July 31, 1947   3 Sheets-Sheet 1

Inventor
Richard L. Wilcox
By Rockwell & Bartholow
Attorneys

Jan. 29, 1952            R. L. WILCOX            2,583,677
METHOD OF MAKING WASHER FACE NUTS OR THE LIKE
Filed July 31, 1947            3 Sheets-Sheet 2
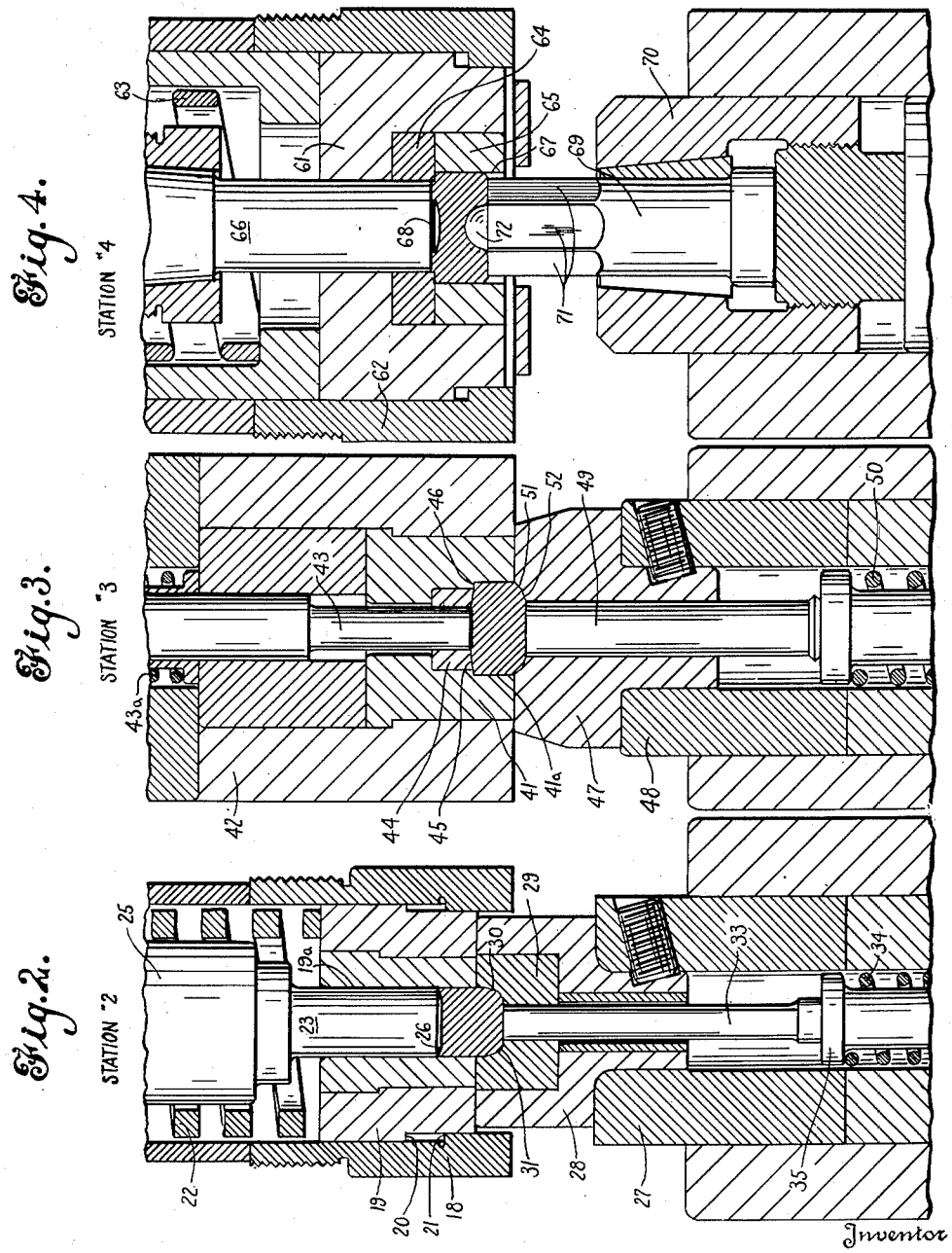
Inventor
Richard L. Wilcox
By Rockwell & Bartholow
Attorneys Jan. 29, 1952 R. L. WILCOX 2,583,677
METHOD OF MAKING WASHER FACE NUTS OR THE LIKE
Filed July 31, 1947 3 Sheets-Sheet 3
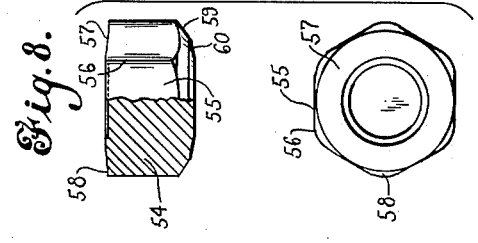
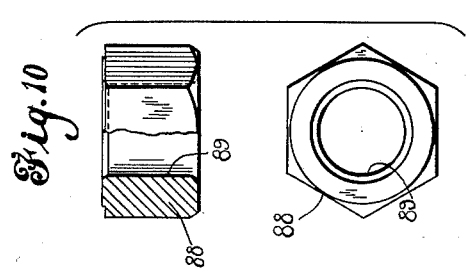
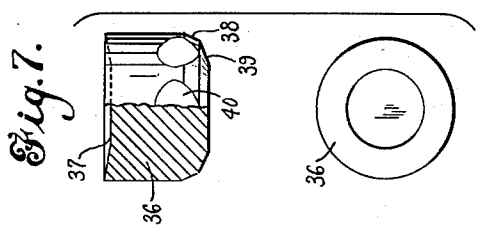
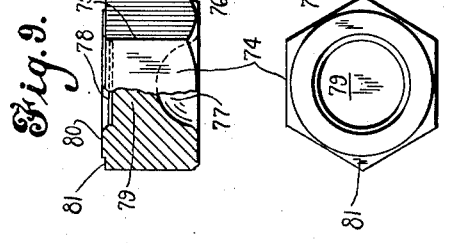
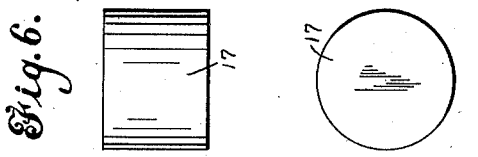
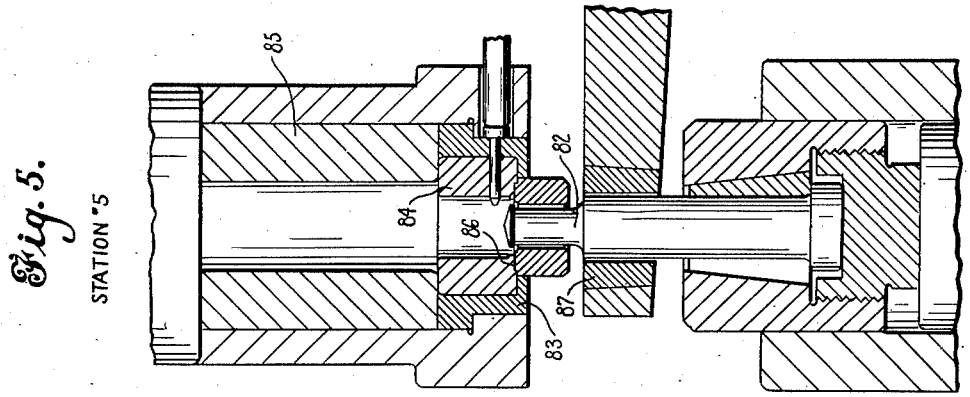
Inventor
Richard L. Wilcox
By Rockwell & Bartholow
Attorneys Patented Jan. 29, 1952

2,583,677

UNITED STATES PATENT OFFICE 2,583,677

METHOD OF MAKING WASHER FACE NUTS OR THE LIKE

Richard Lester Wilcox, Waterbury, Conn., assignor to The Waterbury Farrel Foundry and Machine Company, Waterbury, Conn., a corporation of Connecticut Application July 31, 1947, Serial No. 765,234

14 Claims. (Cl. 10—86)

This invention relates to a method of and machine for making nuts and similar articles, and more particularly a nut having a washer face or an annular raised area upon at least one of its surfaces. As shown, the nut blank resulting from the process of the present application is a polygonal nut having a washer face upon one surface and being chamfered on the opposite face or surface.

As shown in the drawings, the method comprises a series of steps consisting of pressing operations at a plurality of stations in the same machine to cut off a suitable length of solid bar stock, which length becomes the workpiece, and then forming this workpiece while cold into the finished blank. The operations are carried out upon a machine having a plurality of stations at which the several steps of the process are performed, the workpiece being transferred from one station to another, and the machine serving to perform the several operations upon different workpieces or blanks at the same time.

It is contemplated by the present method to employ bar stock of relatively large diameter compared to the width of the finished blank, so as to reduce the amount of lateral flow of the metal which is required during the processing operations. Also, while the finished nut blank is provided with a through opening to receive internal threads, only a relatively small amount of metal is wasted as during the processing operations the nut is heavily indented, leaving only a small web of metal to be punched out by the piercing punch in order to perfect the opening.

Moreover, the operation of the present apparatus and the practice of the present process results in a finished nut blank having a well-formed and clearly defined washer face upon one surface of the nut which is of polygonal shape, the corners of the blank being well filled out and sharply defined and a well formed chamfer being provided upon the face of the nut opposite that upon which the washer face is formed.

One object of the present invention is to provide a novel method of forming a nut blank from solid stock having a washer face upon one surface thereof.

A further object of the invention is to provide a novel method and apparatus for forming a polygonal nut blank from solid bar stock, the nut having a washer face upon one surface thereof, and being formed by a minimum of operations while the workpiece is cold and requiring comparatively little lateral flow of the metal.

A still further object of the invention is to provide a novel method of forming the nut blank having a washer face upon one surface thereof in a series of steps performed at successive stations in a single machine, such that the operations at certain of the stations will be begun or partially performed at preceding stations, thus reducing the work required at succeeding stations.

Still another object of the invention is to provide a machine for forming nut blanks, the machine having a plurality of stations at which successive operations are performed on the work while cold, the work being transferred successively from one station to another and the operations being of such a character as to form the finished blank with a minimum of effort, and the number of operations being relatively small.

To these and other ends the invention consists in the novel features and combinations of parts to be hereinafter described and claimed.

In the accompanying drawings:

Fig. 2 is an enlarged sectional view of the tools employed at station #2 of the machine;

Fig. 3 is a similar view of the tools employed at station #3;

Fig. 4 is an enlarged sectional view of the tools employed at station #4;

Fig. 5 is an enlarged sectional view of the tools employed at station #5 of the machine;

Fig. 6 illustrates in side elevational and top plan view the workpiece employed to make the blank;

Fig. 7 shows similar views of the workpiece after the operation performed at station #2;

Fig. 8 shows similar views of the workpiece after being subjected to the operations performed by the tools at station #3; and Figs. 9 and 10 illustrate similar views of the workpiece after being subjected to the operations performed by the tools at stations #4 and #5.

Figure 1:
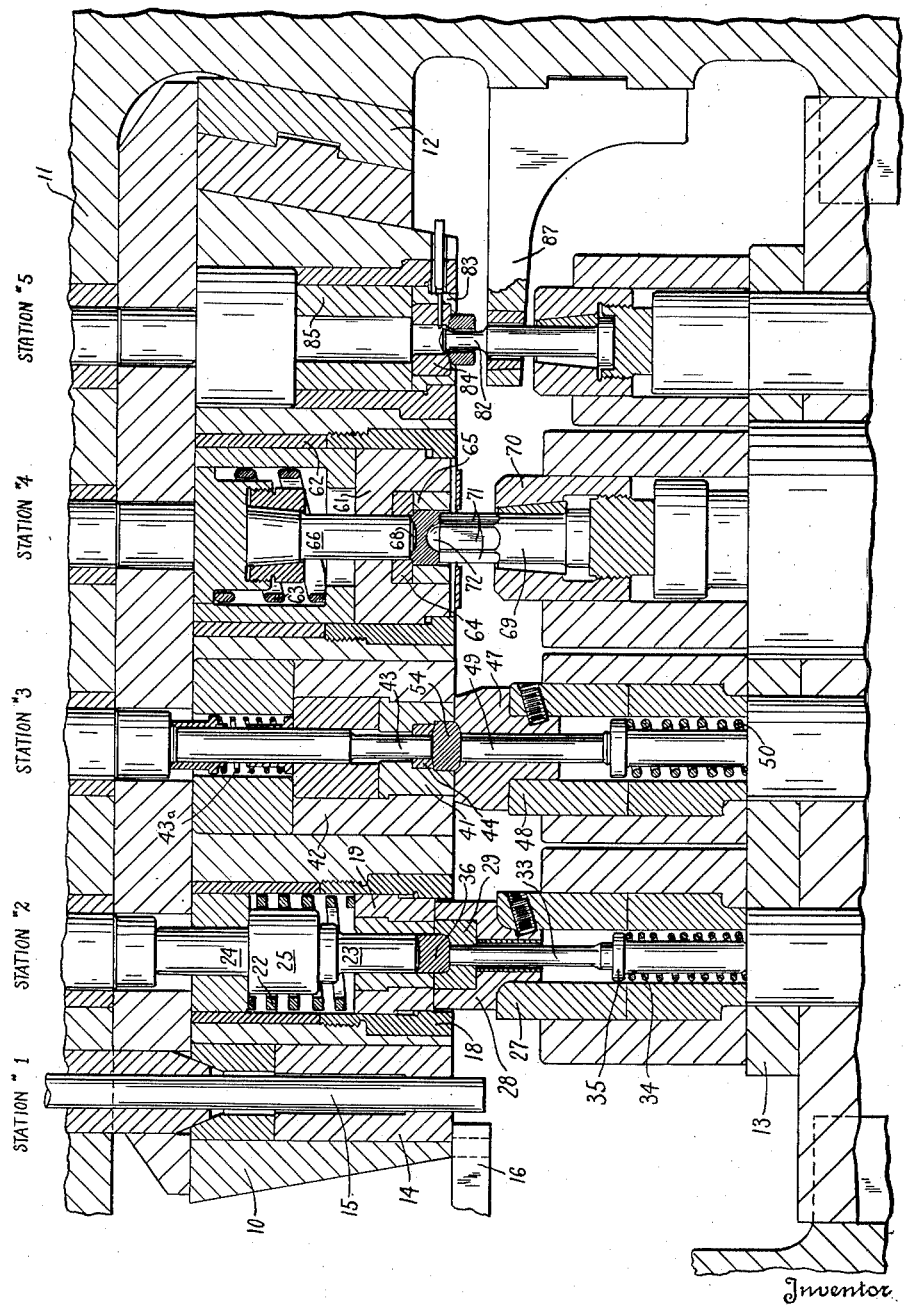
Fig. 1 is a sectional view of the working portion of a nut former or press embodying my invention and designed to carry out my improved process.

To illustrate my method and one embodiment of the machine for carrying out the method, I have shown a die block 10 held at one end of a header frame 11 by wedges 12 and a movable gate 13 designed to be reciprocated toward and from the die block in the usual manner and carrying a plurality of separate tools to cooperate with a plurality of separate dies mounted in the die block, as will be hereinafter explained.

At station #1 is mounted a cut-off die 14 having an opening through which is fed a length of stock 15, so that a portion thereof will protrude from the die to be severed by the cut-off knife 16, which is shown diagrammatically, as this is well known and practiced in the art. After a short length or workpiece 17 (Fig. 6) is cut from the length of stock, this blank is transferred to the second station of the machine by the knife 16 in the usual manner.

At station #2 a die holder 18 is mounted in the die block, the die holder having an opening therein in which is movably guided a die 19 having a shoulder 20 cooperating with an oppositely facing shoulder 21 of the die holder 18 to limit movement of the die in one direction. The die 19 is urged forwardly by a relatively strong compression spring 22, so that the shoulder 20 will normally stand against the shoulder 21 and the face of the die be flush with the forward face of the die holder. Also movably mounted in the die holder is a knock-out pin 23 disposed within an opening in the die insert 19ᵃ and designed to substantially fill this opening. The knock-out pin is actuated by a knock-out rod 24 which may be advanced by suitable mechanism (not shown) against a filler plug 25, which in turn engages the knock-out pin 23. It will be noted that the end of the pin 23 is slightly tapered, as shown at 26, so that, as will be hereinafter explained, it will indent or cup the rear face of the workpiece.

The gate at this station is provided with a punch 27 within which is mounted a die holder 28 carrying a die 29, the latter being provided with an opening 30 which cooperates with the opening in the die insert 19ᵃ to form the workpiece at this station. It may here be noted that the lower portion of the die opening 30 is tapered inwardly to a slight extent, as shown at 31, and is provided with flattened areas which extend above this taper, which flattened areas form flat spots upon the workpiece preparatory to forming the polygonal faces.

The die 29 is also provided with a through opening in which is mounted a pin 33 urged forwardly by the spring 34, and the forward movement being limited by contact of the shoulder 35 with the rear end of the die holder 28.

The gate of the machine is shown in its forward or advanced position in Fig. 1. When withdrawn from this position, the pin 33 will project from the gate, and a workpiece 17 cut from the length of stock will be advanced by the knife 16 to a point in registration with the opening in the die insert 19ᵃ. The gate will then be advanced, and the end of the pin 33 will engage the workpiece and force it out of the cutter 16 into the opening in the die insert, permitting the knife to withdraw. As the gate is advanced, the pin 33 will be retracted relatively to the die 29 after the workpiece has been seated in the opening in the die insert 19ᵃ, and the outer face of the die 29 will come into contact with the outer face of the die insert 19ᵃ, thus enclosing the work within the complemental openings of the dies, at which time the pin 33 will close the rear end of the opening in the die 29. Upon a still further advance of the gate, the punch and die 19 will move together, the latter moving against the tension of the spring 22 until the metal of the workpiece has been caused to flow and completely fill the cavity formed by the complemental openings of the two dies between the pins 23 and 33. At the beginning of the forming operation, the workpiece will be completely enclosed in the die cavities, and the greater part of the forming operation will take place during the time that the punch and die 19 are moving rearwardly together against the tension of the die spring.

As the blank emerges from station #2, it is shaped in the form shown at 36 in Fig. 7, the rear portion being substantially cylindrical in shape and having a recess or cup 37 formed in the rear face, leaving a relatively thin peripheral edge around the cupped area, which enables the metal to flow outwardly in the next step of the process into the rounded corners at the rear face of the workpiece. The forward portion of the blank is tapered, as shown at 38 and 39, and provided with flat spots 40 which are partly upon the tapered portion and partly upon the cylindrical portion.

This workpiece 36 will then be carried to station #3 by any suitable transfer mechanism (not shown). At this station, a fixed die 41 is mounted in a die holder 42, the die being provided with an opening within which moves a knock-out pin 43, this pin being adapted to be retracted by the spring 43ᵃ. Within the die 41 is a die insert 44 through which the pin 43 also extends, this insert being provided with a flared or tapered forward surface 45 at a slight angle to the axis of the die, so as to provide an annular tapering surface upon the workpiece at this point, this surface tapering toward the edge of the blank so that it will be slightly thicker at its central portion which is engaged by the pin 43. It may be noted that the die insert 44 is slightly smaller in diameter than the opening 41ᵃ provided in the die 41 so as to leave a small flat area 46 upon the blank in the die opening, particularly at the corners between the flat sides of the latter. It will be understood that this die opening is of generally polygonal shape with somewhat rounded corners, so as to effect the preliminary shaping of the blank into this form.

At this station, a punch 47 is secured to the gate in a punch holder 48, and movably associated with the punch is a pin 49 urged outwardly by the spring 50. The punch is provided in its forward face with a complemental opening, this opening comprising angular or frusto-conical portions 51 and 52, which give the front face of the workpiece a generally dome-shaped configuration, the lateral wall of the dome portion being angular, however, rather than rounded. The opening in the punch also is provided with flattened faces having somewhat rounded or unfinished corners between them to cooperate with the opening in the die 41 to form the blank. The end of the pin 49 is substantially flat, so that the extreme forward face of the nut below the domed or angled portions 51 and 52 will be substantially flat.

The workpiece, after it has been acted upon by the tools at station #3, is shown at 54 in Fig. 8 of the drawings. It will be apparent that, when the workpiece leaves station #3, it will be formed with generally flattened sides 55 having unfinished or rounded corners 56. The rear face of the workpiece will be provided with an outwardly inclined or angular surface 57, this surface being of generally annular shape and leaving flat spots 58 adjacent the rounded corners, which flat spots are a vital factor in completely filling out the corners of the blank in the subsequent operations. As will be apparent from the succeeding description, the outwardly inclined angular surface 57 becomes the washer face in the finished nut.

The lower portion of the nut is provided with two substantially angular surfaces 59 and 60, these surfaces being formed by the portions 51 and 52 of the opening in the punch. It will be noted that the surfaces 59 and 60 make a much sharper angle with the general plane of the front and rear surfaces of the blank than does the inclined surface 57.

The blank 54 is then transferred to station #4 on the machine where the formation of the workpiece will be completed except for the piercing operation. At this station, a floating die 61 is movably mounted in a die holder 62, the die being urged outwardly by a strong spring 63. Within an opening in the die 61 are mounted die inserts 64 and 65, the former being provided with a round opening within which operates the punch 66. The die insert 65 is provided with a polygonal opening 67 having sharply defined corners to properly form the finished nut. The punch 66 is provided with a reduced end 68 to indent the outer surface of the workpiece, and, as will be seen, the opening in the die insert 64 is slightly smaller than that in the insert 65, the result being to form a raised area or washer face on the workpiece at this station, this raised area being of annular form and being spaced inwardly to a slight extent from the lateral edges of the workpiece, particularly at the corners.

The gate at this station is provided with a fixed punch 69 held in a punch holder 70. This punch is provided with polygonal faces 71 and a reduced end 72 to form a relatively deep recess in the forward face of the workpiece. It will be noted that the punch 69 is slightly smaller than the opening 67 in the die insert 65, so as to leave a small area of the workpiece which is not contacted by the face of the punch, thus forming a chamfered edge on the front face of the blank. The reduced ends 68 and 72 of the punches 66 and 69 are so shaped as to countersink the indentations made in the faces of the blank. This prevents any chip or burr being thrown out beyond either face of the nut when the thread is tapped.

When the blank has been carried to a position in alignment with the tools at station #4 by the usual transfer mechanism, the gate advances, and the punch 69 pushes the blank out of the transfer mechanism into the opening 67 of the die insert 65. Continued advance of the punch causes the blank to be compressed between the punches 66 and 69, and the metal of the blank will be caused to flow against the polygonal sides of the die opening and to fill the sharp corners between these sides. Also, the die 61 will be forced rearwardly slightly against the spring 63, so that the rear end of the workpiece will be caused to take up against the end of the fixed punch 66, thus forming an indentation in the rear face of the blank and, at the same time, forming the annular raised washer face around this recess against the end of the punch and within the opening of the die insert 64. The metal of the workpiece about the washer face flows outwardly into the corners of the polygonal die insert 65 forwardly of the face of the insert 64.

When the gate is withdrawn, the blank will be ejected by the punch 66, and will be carried to station #5. At this time, the blank is in the form shown in Fig. 9 of the drawings, at which it will be seen that it is provided with flat faces 74 having sharply defined corners 75 between them. The forward face of the blank will be chamfered, as shown at 76, and will be provided with a relatively deep recess or indentation 77. The rear face of the blank will be provided with a central indentation 78, leaving a web of metal 79 between this and the indentation 77. About the indentation 78 a raised annular area 80 providing a washer face will have been formed, leaving a forwardly spaced flattened area 81 adjacent the corners of the wrench faces and lying without the annular area 80.

At station #5, the gate is provided with a piercing punch 82 which cooperates with a retainer die 83 and an anvil die 84, these two dies being seated upon a fixed bushing 85. As will be apparent from Fig. 5 of the drawings, the anvil die 84 is slightly recessed, as shown at 86, the recess being of the same size as to diameter and depth as the dimensions of the washer face 80 formed upon the blank, so that all portions of the rear surface of the blank will rest upon the face of the anvil die during the piercing operation.

Moreover, it will be noted that the retainer die 83 surrounds only the rear portion of the blank to prevent this portion from expanding during the piercing operation. By this arrangement, the retainer die 83 may be made solid instead of sectional, and, while the blank will be effectively prevented from swelling or enlarging, the blank may be readily withdrawn from the die upon return of the punch and stripped by the usual stripper 87.

The blank, after it has been operated upon by the tools at station #5, is shown at 88 in Fig. 10 of the drawings where, as will be apparent, it is provided with a smooth clean opening 89 for receiving a suitable thread to complete the manufacture of the nut.

While I have shown and described a preferred embodiment of my invention, it will be understood that it is not to be limited to all of the details shown, but is capable of modification and variation within the spirit of the invention and within the scope of the claims.

What I claim is:

1. The method of making a nut blank, which comprises cutting a workpiece from a length of solid stock, forming a cup in the face of the workpiece at one end to form a relatively thin peripheral edge while reducing its cross sectional size adjacent the other end, and then applying pressure to the workpiece to force outwardly the metal at the cupped face to form at said face an outwardly inclined area surrounding a central flat area while forming flattened areas on the side walls of the workpiece, and flat spots on the face exteriorly of said inclined area.

2. The method of making a nut blank, which comprises cutting a workpiece from a length of solid stock, forming a cup in the face of the workpiece at one end while reducing its cross sectional size adjacent the other end, then applying pressure to the workpiece to form at said cupped face a central flat area and a surrounding area sloping outwardly toward the other end of the blank, and then forming said sloping area into a raised substantially flat annular surface by pressure applied to opposite faces of the blank.

3. The method of making a nut blank, which comprises cutting a workpiece from a length of solid stock, cupping the face of the workpiece at one end while reducing its cross sectional size adjacent the other end, then applying pressure to the workpiece to flow the metal adjacent the cupped face to form at said face an outwardly inclined area surrounding a central flat area and form flattened areas on the side walls of the workpiece, and then by pressure on opposite faces of the blank while confining the latter laterally forming said inclined area into a raised substantially flat annular surface and indenting the blank at its opposite faces.

4. The method of making a nut blank, which comprises cutting a workpiece from a length of solid stock, cupping the face of the workpiece at one end while reducing its cross sectional size adjacent the other end, then applying pressure to the workpiece to flow the metal adjacent the cupped face to form at said face an outwardly inclined area surrounding a central flat area with flat spots outwardly of said inclined area, and simultaneously forming two substantially annular tapering areas on the sides of the workpiece adjacent the reduced end.

5. The method of making a nut blank, which comprises cutting a workpiece from a length of solid stock, cupping the face of the workpiece at one end while reducing its cross sectional size adjacent the other end, then applying pressure to the workpiece to flow the metal adjacent the cupped face to form at said face an outwardly inclined area surrounding a central flat area, and simultaneously forming two substantially annular tapering areas on the sides of the workpiece adjacent the reduced end, the angle of said inclined area with the adjacent face of the blank being less than that of either of said tapering areas with the face of the blank at the reduced end.

6. The method of making a nut blank, which comprises cutting a workpiece from a length of solid stock, cupping the face of the workpiece at one end while reducing its cross sectional size adjacent the other end, then applying pressure to the workpiece to flow the metal adjacent the cupped face to form at said face an outwardly inclined area surrounding a central flat area, and then indenting both faces of the blank, while confining it laterally in a die, to cause the metal to flow axially of the blank and increase the thickness thereof adjacent the outer portion to form substantially straight-sided walls thereon and form said inclined area into a raised annular washer face.

7. The method of making a nut blank, which comprises cutting a workpiece from a length of solid stock, cupping the face of the workpiece at one end while reducing its cross sectional size adjacent the other end, then applying pressure to the workpiece to flow the metal adjacent the cupped face to form at said face an outwardly inclined area surrounding a central flat area, and then indenting both faces of the blank, while confining it laterally in a die, to cause the metal to flow axially of the blank and increase the thickness thereof adjacent the outer portion to form substantially straight-sided walls thereon and form said inclined area into a raised annular washer face, the indentation at the end of the blank opposite that of the washer face being of substantially greater depth than that at the washer face and then piercing out the metal between said indentations to form an opening in the blank.

8. The method of making a nut blank, which comprises cutting a workpiece from a length of solid stock, forming a cup in the face of the workpiece at one end while reducing its cross sectional size adjacent the other end, then applying pressure to the workpiece to flow the metal adjacent the cupped face to form at said face an outer area inclined toward the opposite face of the blank, said area surrounding a central flat area, and then applying pressure to the blank to indent the flattened area and force axially the metal at said inclined area to form a central indentation and a surrounding substantially annular flat washer face.

9. The method of making a nut blank, which comprises cutting a workpiece from a length of solid stock, cupping the face of the workpiece at one end while reducing its cross sectional size adjacent the other end, then applying pressure to the workpiece to flow the metal adjacent the cupped face to form at said face an outer area inclined toward the opposite face of the blank, said area surrounding a central flat area with flat spots exteriorly of said inclined area and flattened areas on the side walls of the workpiece, and then upsetting the metal at said face to form a central indentation and a surrounding substantially flat washer face, the latter projecting from the metal at the edge of the face of the blank.

10. The method of making a polygonal nut blank, which comprises cutting a workpiece from a length of solid stock, cupping the face of the workpiece at one end to form a relatively thin peripheral edge while reducing its cross sectional size adjacent the other end, then applying pressure to the workpiece to flow the metal adjacent the cupped face to form at said face an outwardly sloping area surrounding a central flat area with flat spots beyond said sloping area and flattened areas on the side walls of the workpiece, and then flowing the metal of the workpiece to form on the latter face a substantially flat annular area having an indentation therein, said annular area projecting from the metal around said area at the edge of the blank and perfecting the flat lateral faces on the side walls.

11. The method of making a polygonal nut blank, which comprises cutting a workpiece from a length of solid stock, cupping the face of the workpiece at one end to form a relatively thin peripheral edge while reducing its cross sectional size adjacent the other end, then applying pressure to the workpiece to flow the metal adjacent the cupped face to form at said face an annular outwardly sloping area surrounding a central flat area with flat spots beyond said sloping area and flattened areas on the side walls of the workpiece, then flowing the metal of the workpiece to form on the latter face a substantially flat annular area having an indentation therein, said annular area projecting from the metal around said area at the edge of the blank and perfecting the flat lateral faces on the side walls, forming a relatively deep indentation at the other face of the blank, and causing the metal to flow axially to increase the thickness of the blank around said indentation.

12. The method of making a polygonal nut blank, which comprises cutting a workpiece from a length of solid stock, cupping the face of the workpiece at one end to form a relatively thin peripheral edge while reducing its cross sectional size adjacent the other end, then applying pressure to the workpiece to flow the metal adjacent the cupped face to form at said face an annular outwardly sloping area surrounding a central flat area with flat spots beyond said sloping area and flattened areas on the side walls of the workpiece, then flowing the metal of the workpiece to form on the latter face a substantially flat annular area having an indentation therein, said annular area projecting from the metal around said area at the edge of the blank and perfecting the flat lateral faces on the side walls, forming a relatively deep indentation at the other face of the blank, and causing the metal to flow axially to increase the thickness of the blank around said indentation, while forming a chamfered surface at said latter face.

13. The method of making a polygonal nut blank, which comprises cutting a workpiece from a length of solid stock, cupping the face of the workpiece at one end to form a relatively thin peripheral edge while reducing its cross sectional size adjacent the other end, then applying pressure to the workpiece to flow the metal adjacent the cupped face to form at said face an annular outwardly sloping area surrounding a central flat area with flat spots beyond said sloping area and flattened areas on the side walls of the workpiece, then flowing the metal of the workpiece to form on the latter face a substantially flat annular area having an indentation therein, said annular area projecting from the metal around said area at the edge of the blank and perfecting the flat lateral faces on the side walls, forming a relatively deep indentation at the other face of the blank, causing the metal to flow axially to increase the thickness of the blank around said indentation, while forming a chamfered surface at said latter face, and then piercing a hole through the blank between said indentations.

14. The method of forming nut blanks as set forth in claim 3, wherein the indentations at the opposite faces of the blank are countersunk.

RICHARD LESTER WILCOX.

REFERENCES CITED

The following references are of record in the file of this patent:

UNITED STATES PATENTS

| Number | Name | Date |
|---|---|---|
| 1,674,310 | Topping | June 19, 1928 |
| 1,832,167 | Wilcox | Nov. 17, 1931 |
| 1,977,162 | Wilcox | Oct. 16, 1934 |
| 1,993,137 | Gibney | Mar. 5, 1935 |
| 2,013,460 | Erdman | Sept. 3, 1935 |
| 2,057,527 | Johnson | Oct. 13, 1936 |
| 2,287,214 | Wilcox | June 23, 1942 |